US012563487B2

(12) United States Patent
Polaganga

(10) Patent No.: US 12,563,487 B2
(45) Date of Patent: Feb. 24, 2026

(54) MANAGING FIXED WIRELESS ACCESS FOR EFFICIENT ENERGY USAGE

(71) Applicant: T-MOBILE INNOVATIONS LLC, Overland Park, KS (US)

(72) Inventor: Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 528 days.

(21) Appl. No.: 18/124,314

(22) Filed: Mar. 21, 2023

(65) Prior Publication Data

US 2024/0323833 A1     Sep. 26, 2024

(51) Int. Cl.
*H04W 52/02* (2009.01)
*H04W 24/02* (2009.01)

(52) U.S. Cl.
CPC ....... *H04W 52/0206* (2013.01); *H04W 24/02* (2013.01)

(58) Field of Classification Search
CPC .......................... H04W 52/0206; H04W 24/02
See application file for complete search history.

(56) References Cited

U.S. PATENT DOCUMENTS

2023/0180322 A1* 6/2023 Sevindik et al. ......... H04L 5/14
370/329
2023/0403604 A1* 12/2023 Maleki .................. H04W 52/02

FOREIGN PATENT DOCUMENTS

CN          111417180 A   *  7/2020   .......... H04W 72/535
* cited by examiner

*Primary Examiner* — Kevin T Bates
*Assistant Examiner* — Jaeyoung Kwak
(74) *Attorney, Agent, or Firm* — Shook Hardy & Bacon L.L.P.

(57) ABSTRACT

Aspects provided herein provide methods, systems, and a non-transitory computer storage media storing computer-useable instructions for managing fixed wireless access (FWA). The method begins with determining that a number of network users connected to a base station is less than an operator defined threshold during a predefined time of day and is greater than a sleep mode threshold, the number of network users comprising an FWA portion and a non-FWA portion. Next, it is determined that the non-FWA portion of network users is less than the sleep mode threshold. Next, the method continues with determining that the FWA portion of network users are configured to communicate with the base station in a non-standalone (NSA) mode, The method then performs an optimization action based on a comparison between an aggregated data buffer requirement and a predetermined aggregated data buffer threshold.

20 Claims, 5 Drawing Sheets

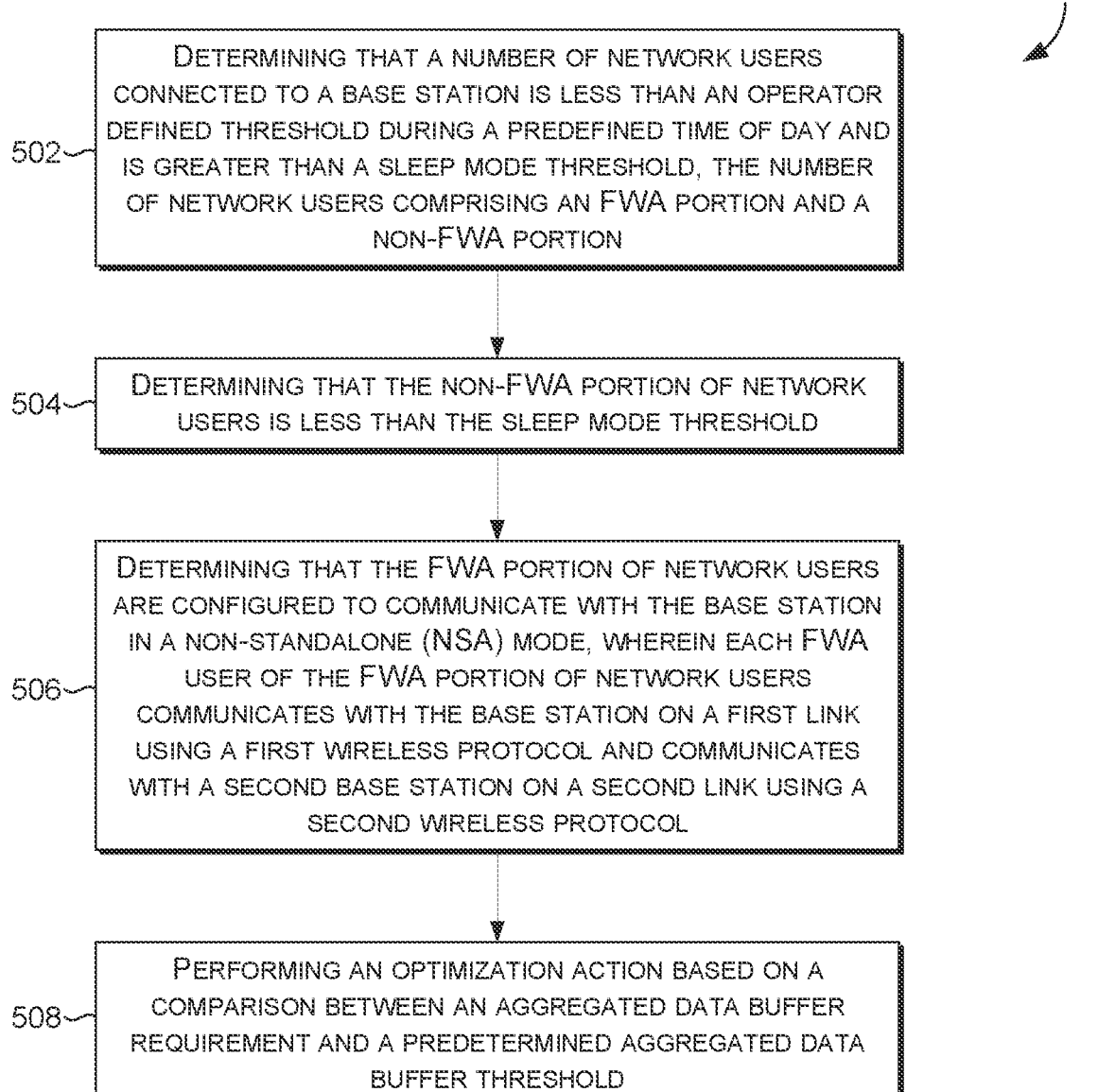

*500*

502 — DETERMINING THAT A NUMBER OF NETWORK USERS CONNECTED TO A BASE STATION IS LESS THAN AN OPERATOR DEFINED THRESHOLD DURING A PREDEFINED TIME OF DAY AND IS GREATER THAN A SLEEP MODE THRESHOLD, THE NUMBER OF NETWORK USERS COMPRISING AN FWA PORTION AND A NON-FWA PORTION

504 — DETERMINING THAT THE NON-FWA PORTION OF NETWORK USERS IS LESS THAN THE SLEEP MODE THRESHOLD

506 — DETERMINING THAT THE FWA PORTION OF NETWORK USERS ARE CONFIGURED TO COMMUNICATE WITH THE BASE STATION IN A NON-STANDALONE (NSA) MODE, WHEREIN EACH FWA USER OF THE FWA PORTION OF NETWORK USERS COMMUNICATES WITH THE BASE STATION ON A FIRST LINK USING A FIRST WIRELESS PROTOCOL AND COMMUNICATES WITH A SECOND BASE STATION ON A SECOND LINK USING A SECOND WIRELESS PROTOCOL

508 — PERFORMING AN OPTIMIZATION ACTION BASED ON A COMPARISON BETWEEN AN AGGREGATED DATA BUFFER REQUIREMENT AND A PREDETERMINED AGGREGATED DATA BUFFER THRESHOLD

FIG. 5

MEMORY

612

PROCESSOR(S)

614

PRESENTATION
COMPONENT(S)

616

RADIO(S)

624

I/O PORT(S)

618

I/O COMPONENTS

620

POWER SUPPLY

622

610

MANAGING FIXED WIRELESS ACCESS FOR EFFICIENT ENERGY USAGE

BACKGROUND

The introduction of 5G services has boosted wireless network operator capacity, enabling providers to offer new services such as Fixed Wireless Access (FWA). FWA is more cost-effective and efficient than traditional cable services as the services are provided wirelessly. Many potential customers lack reliable access to internet services because those customers reside in a "digital desert" with little to no fiber optic cables laid in their neighborhoods. FWA can provide a solution, however, energy consumption may pose challenges due to the nature of FWA. FWA is always connected to the network and does not enter a sleep mode. The nature of FWA makes it energy intensive and can pose challenges to operational expenses for wireless network operators. In addition, the increased energy used in FWA poses a significant challenge to meeting climate sustainability goals.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems are provided for managing FWA access for efficient energy usage. While FWA is always on, users, whether home or business users, are not always active. Businesses may only use the service during operating hours and home users may use the service during the day, but not overnight. Energy savings can be realized if a network operator may put cells into a sleep mode when users are not active. A method for managing FWA access begins with determining that a number of network users connected to a base station is less than an operator defined threshold during a predefined time of day and is greater than a sleep mode threshold, the number of network users comprising an FWA portion and a non-FWA portion. Next, it is determined that the non-FWA portion of network users is less than the sleep mode threshold. The method then continues with determining that the FWA portion of network users are configured to communicate with the base station in a non-standalone (NSA) mode, with each FWA user of the FWA portion of network user communicating with the base station on a first link using a first wireless protocol and communicating with a second base station on a second link using a second wireless protocol. The method then performs an optimization action based on a comparison between an aggregated data buffer requirement and a predetermined aggregated data buffer threshold.

BRIEF DESCRIPTION OF THE SEVERAL VIEWS OF THE DRAWINGS

Implementations of the present disclosure are described in detail below with reference to the attached drawing figures, wherein:

FIG. 5 is a flow diagram of an exemplary method for managing FWA for efficient energy usage, in which aspects of the present disclosure may be employed, in accordance with aspects herein.

DETAILED DESCRIPTION

Figure 1:
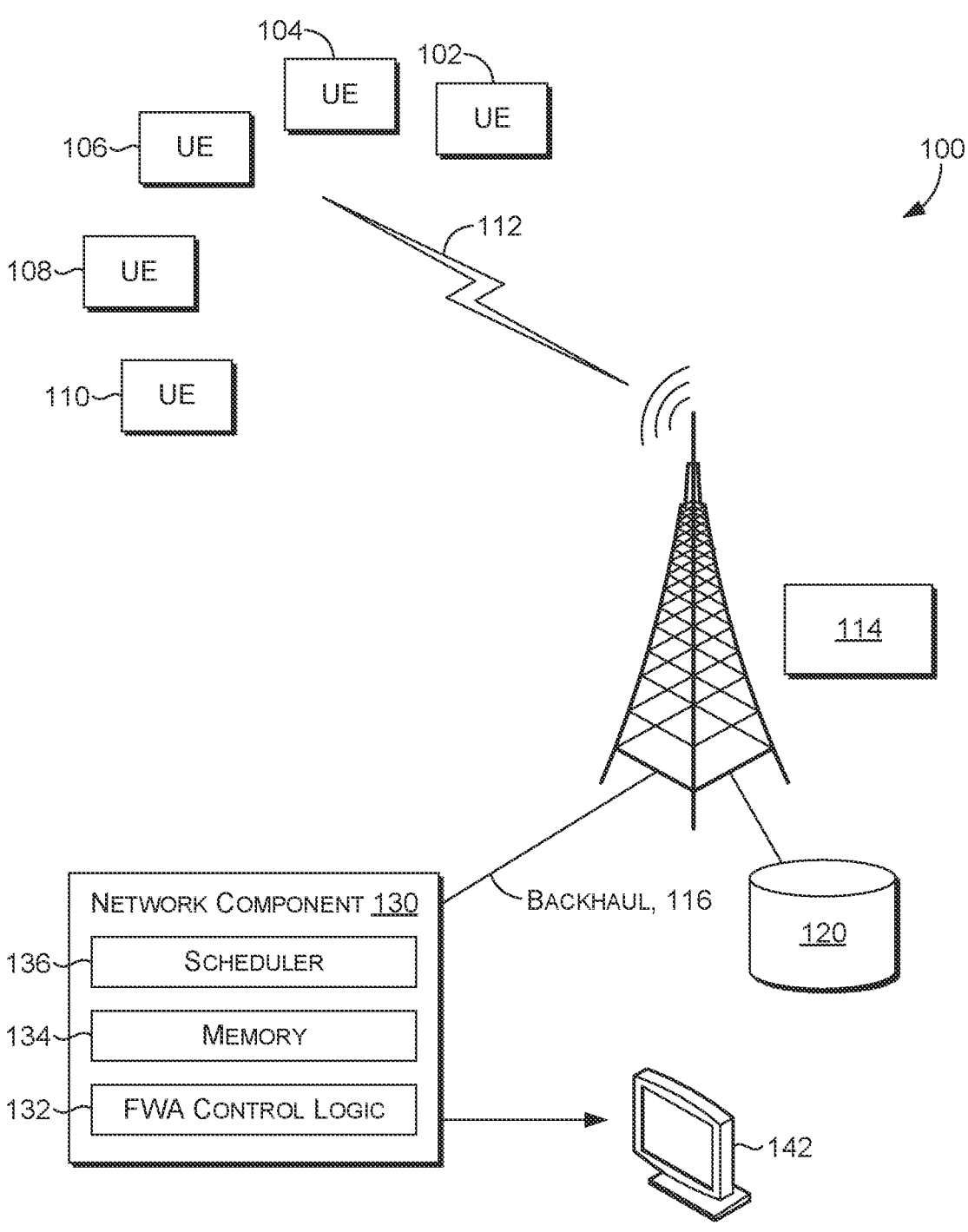
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 6G | Sixth-Generation Cellular Communication System |
| AI | Artificial Intelligence |
| CD-ROM | Compact Disk Read Only Memory |
| CDMA | Code Division Multiple Access |
| eNodeB | Evolved Node B |
| FWA | Fixed Wireless Access |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| ML | Machine Learning |
| PC | Personal Computer |
| PCS | Personal Communications Service |
| PDA | Personal Digital Assistant |
| PDSCH | Physical Downlink Shared Channel |
| PHICH | Physical Hybrid ARQ Indicator Channel |

-continued

| | |
|---|---|
| PUCCH | Physical Uplink Control Channel |
| PUSCH | Physical Uplink Shared Channel |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RSSI | Received Transmission Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 32nd Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. A base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device such as a Fixed Wireless Access (FWA) device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for managing FWA access for efficient energy usage is provided. The method begins with determining that a number of network users connected to a base station is less than an operator defined threshold during a predefined time of day and is greater than a sleep mode threshold, the number of network users comprising an FWA portion and a non-FWA portion. Next, it is determined that the non-FWA portion of network users is less than the sleep mode threshold. The method then continues with determining that the FWA portion of network users are configured to communicate with the base station in a non-standalone (NSA) mode, with each FWA user of the FWA portion of network user communicating with the base station on a first link using a first wireless protocol and communicating with a second base station on a second link using a second wireless protocol. The method then performs an optimization action based on a comparison between an aggregated data buffer requirement and a predetermined aggregated data buffer threshold.

A second aspect of the present disclosure provides a method for managing FWA access for efficient energy usage is provided. The method begins with determining that a number of network users of a base station is less than an operator defined threshold during a predefined time of day and is greater than a sleep mode threshold, with the number of network users comprising both an FWA portion and a non-FWA portion. Next, it is determined that the non-FWA portion of network users is less than a sleep mode threshold. The method then continues with determining that the FWA portion of network users are configured to communicate with the base station in a standalone (SA) mode and a non-SA mode. The method concludes with performing an optimization action based on a comparison between an aggregated data buffer requirement and a predetermined aggregated data buffer threshold.

Another aspect of the present disclosure is directed to a non-transitory computer storage media storing computer-useable instructions that, when used by one or more processors, cause the processors to determine that a number of network users connected to a base station is less than an operator defined threshold during a predefined time of day and is greater than a sleep mode threshold. The processors then determine that the number of network users is less than the sleep mode threshold. The instructions continue with determine a portion of network users configured to communicate with the base station in a NSA mode, with the portion of network users communicating in the NSA mode use a first wireless protocol and communicate with a second base station on a second link using a second wireless protocol. The instructions conclude with perform an optimization action based on a comparison between an aggregated data buffer requirement and a predetermined aggregated data buffer threshold.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user equipment (UE) devices 102, 104, 106, 108, and 110, base station 114 (which may be a cell site or the like), and one or more communication channels 112. A router used for FWA in a customer's home or business may also communicate through the network environment 100. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (600) that communicates via wireless communications with the base station 114 in order to interact with a public or private network.

Figure 6:
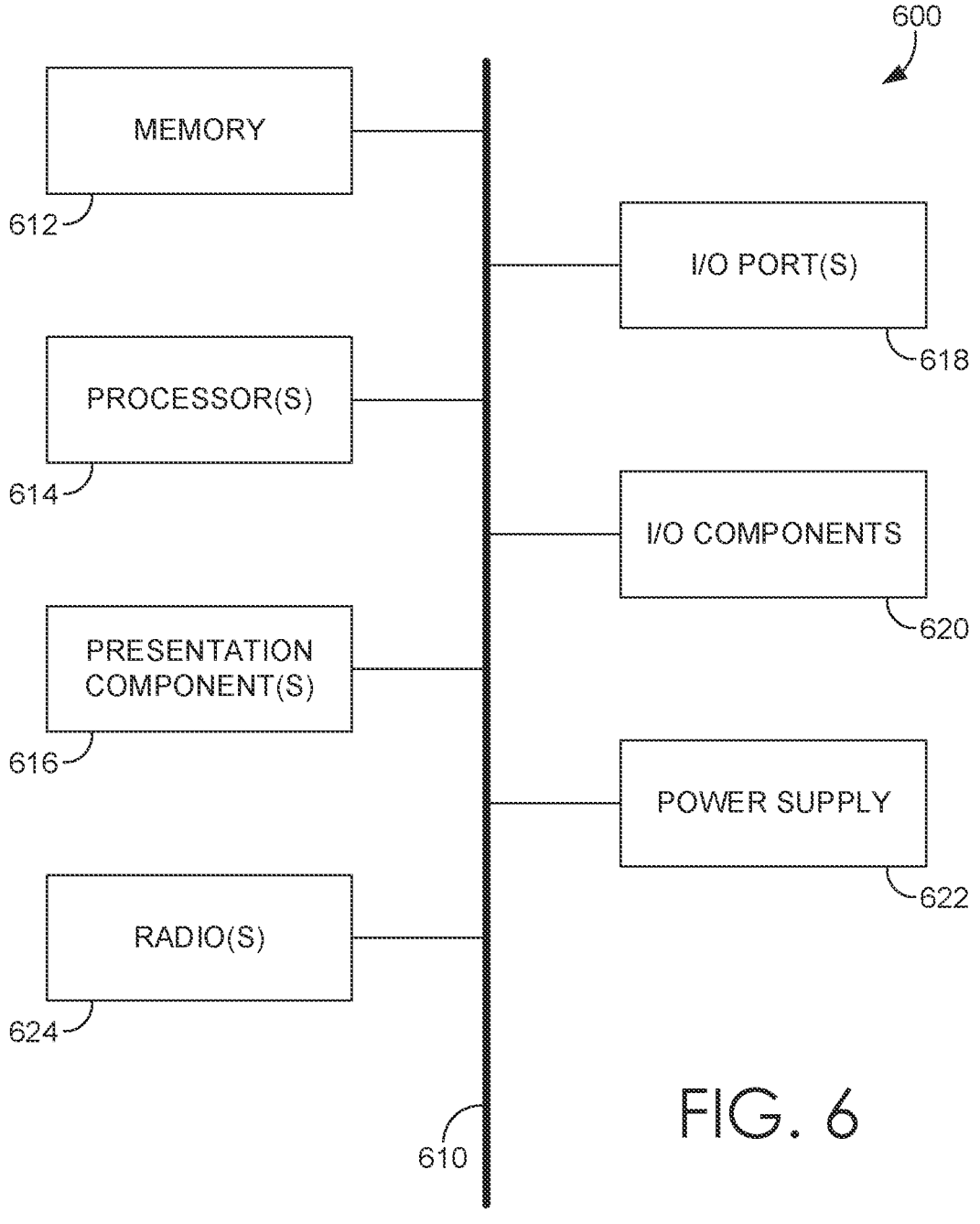
FIG. 6 depicts an exemplary computing device suitable for use in implementations of the present disclosure, in accordance with aspects herein.

In some aspects, each of the UEs 102, 104, 106, 108, and 110 may correspond to computing device 600 in FIG. 6. Each of the UEs 102, 104, 106, 108, and 110 may be a router used for FWA service. Thus, a UE can include, for example, a display(s), a power source(s) (e.g., a battery), a data store(s), a speaker(s), memory, a buffer(s), a radio(s) and the like. In some implementations, for example, devices such the UEs 102, 104,106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include a plurality of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1x circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a FWA control logic 132, a memory 134, and a scheduler 136. All determinations, calculations, and data further generated by the FWA control logic 132 and scheduler 136 may be stored at the memory 134 and also at the data store 142. Although the network component 130 is shown as a single component comprising the FWA control logic 132, memory 134, and the scheduler 136, it is also contemplated that each of the FWA control logic 132, memory 134, and scheduler 136 may reside at different locations, be its own separate entity, and the like, within the home network carrier system.

The network component 130 is configured to retrieve signal information, UE device information, latency information, including quality of service (QOS) information, FWA usage, and metrics from the base station 114 or one of the UEs 102, 104, 106, 108, and 110. UE device information can include a device identifier and data usage information. The scheduler 136 can monitor the activity of the UEs, 104, 106, 108, and 110 as well as any routers in the network. The scheduler 136 notes when routers for FWA are idle and in conjunction with the FWA control logic 132 moves the FWA users to other layers in the NR network. After moving the FWA users to other suitable layers in the NR network the scheduler 136 may shut down cells to realize energy savings. The determination to shut down a cell or cells may be made based on usage data, time of day, and usage patterns, that indicate a cell does not need power for the period evaluated.

Figure 2:
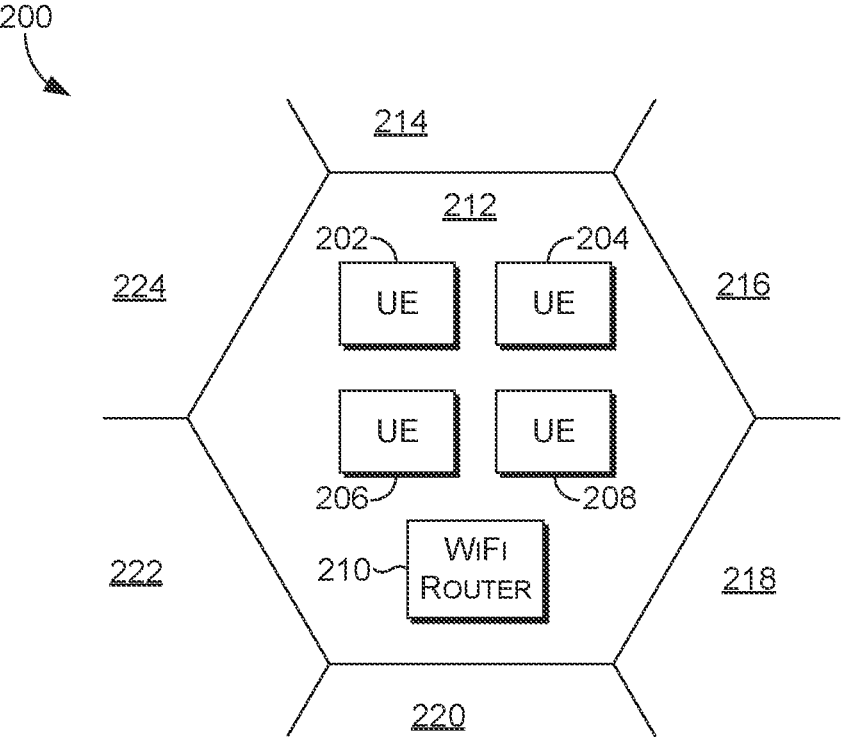
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and WiFi router 210, may be located within geographic area 200 collecting UE data that is useable by network component 130, in accordance with aspects herein. UEs 202, 204, 206, and 208 can move within the cell they are currently occupying, such as cell 212 or can move to other cells such as adjoining cells 214, 216, 218, 220, 222 and 224.

FWA is a type of wireless technology that enables broadband access using radio frequencies at a fixed location. It may be used to connect homes and businesses to the internet without physical cables or switching boxes. FWA provides users with immediate access because physical infrastructure is not needed. In some instances, an FWA device may be connected to the network at all times by default, so base stations supporting FWA are also prevented from entering idle mode. Aspects discussed herein provide mechanisms for network operators to improve the energy efficiency of base stations by moving FWA users to other layers when appropriate and shutting down base stations to provide energy savings.

Figure 3:
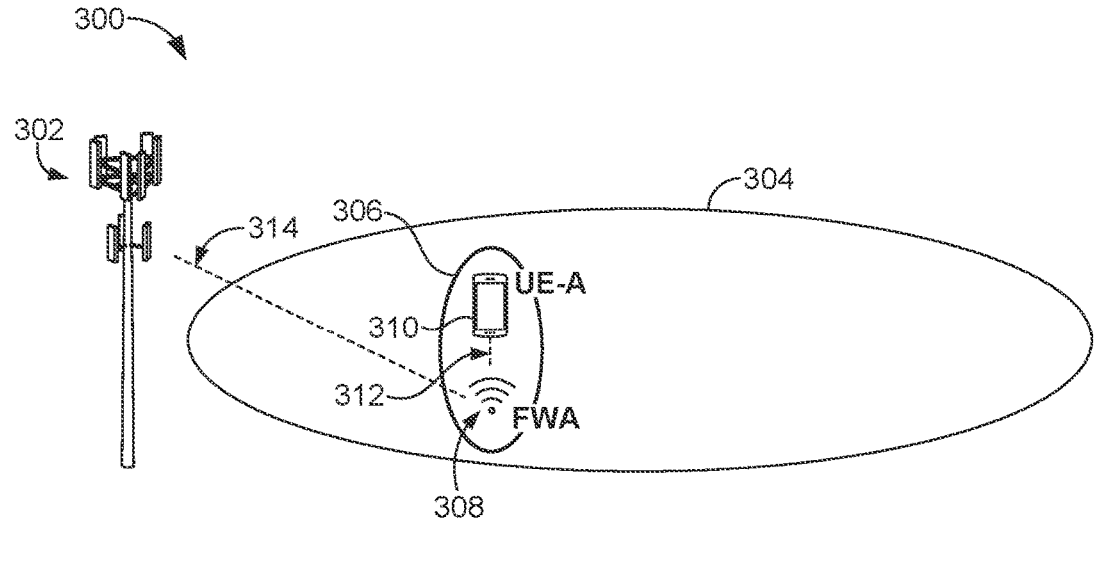
FIG. 3 depicts a diagram of an exemplary network environment incorporating FWA via Wi-Fi, in which implementations of the present disclosure may be employed, in accordance with aspects herein.

FIG. 3 depicts a diagram of an exemplary network environment providing wireless service to FWA equipment 308, in which implementations of the present disclosure may be employed. The system 300 includes a base station 302 that provides service to an NR cell coverage area 304. The FWA equipment 308, located within the NR cell coverage area 304, utilizes a backhaul connection 312 to the base station 302 and provides internet access via a wireless protocol (e.g., WiFi/802.11) and related services to a WiFi coverage area 306 (e.g., at a residential or business location). A UE 310 located within the WiFi coverage area 306 can access the internet through the FWA equipment 308 and its backhaul connection 312 to the base station 302. UE 310 communicates with the FWA equipment 308 through a WiFi connection 314.

Figure 4:
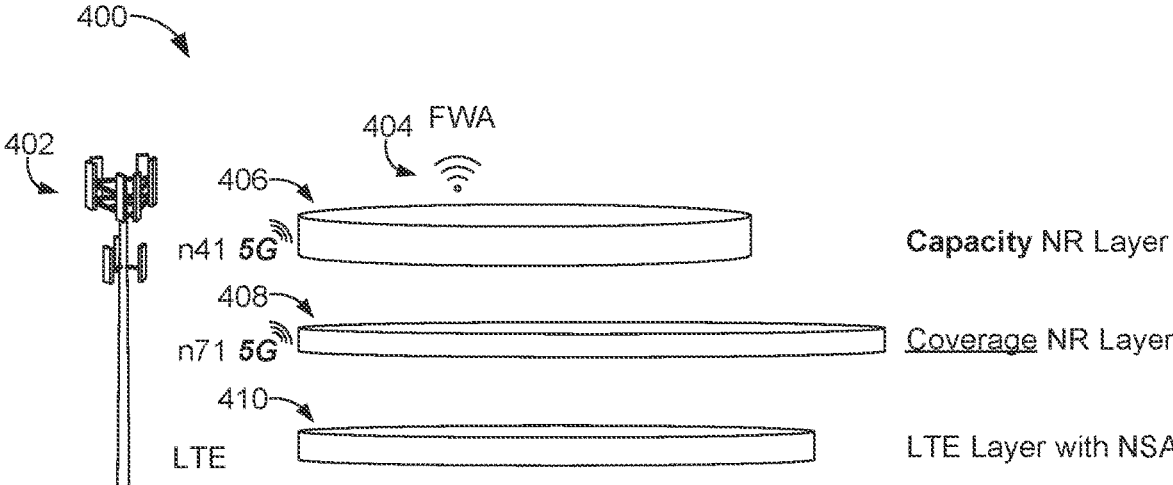
FIG. 4 is a diagram of layers in a New Radio (NR) FWA implementation in a network, in which implementations of the present disclosure may be employed, in accordance with aspects herein.

FIG. 4 illustrates an environment 400 of layers in a 5G network, in which implementations of the present disclosure may be employed. The environment 400 includes a base station 402 which operates multiple layers including multiple 5G layers. The 5G layers may be accessed through FWA equipment 404 that uses the 5G layers to access the internet. A first layer 406 is a 5G capacity NR layer that may use frequency band n41. N41 is a 2500 MHz band that may also be known as the 2.5 GHz 5G band and is a mid-band frequency offering a balance between speed and coverage. These features make the n41 band useful for cities.

A second layer 408 is a 5G coverage NR layer that may use frequency band n71. The n71 band is a low band 5G layer with good range, capable of monger distance coverage. The increased range of n71 may make this band suitable for rural areas. The n71 band uses a 600 MHz frequency. The n71 band may also be used with a 5G NR standalone network. A third layer 410 is an LTE layer with non-standalone service.

Standalone 5G does not depend on an LTE evolved packet core to operate. Instead, it pairs 5G radios, such as those in UEs or other devices, with a cloud-native 5G network. The 5G core is a service-based architecture that virtualizes network functions. In contrast, non-standalone 5G pairs a 5G RAN with the LTE evolved packet core. Because the 5G RAN relies on the 4G network to manage control and signaling information and the 4G RAN continues operating, the architecture is known as non-standalone. Non-standalone 5G allows network operators to leverage their existing LTE infrastructure while delivering faster speeds and more reliable connections to their customers.

Standalone 5G core architecture enables many new features and functionalities beyond additional bandwidth. Some new functionalities include ultra-reliable low-latency communications, a necessary features for applications like autonomous vehicle control, precision robotics, including precision surgical robots, machine vision, and augmented reality and virtual reality systems. These applications rely on low latency for safety and to provide a satisfactory user experience.

Managing FWA for efficient energy usage allows cells to enter a sleep mode during times of day when network access is not needed. These times may occur routinely, such as when a business closes for the day or a homeowner goes to sleep. The history of these active regular users may be tracked and recorded to determine what times of day the cell could shut down. The cell that may enter idle mode may be the FWA equipment 308 in FIG. 3 and the FWA equipment 404 in FIG. 4. If an active regular user is below an operator defined threshold during a pre-defined time period, then the method described below may be used.

If the active regular user's usage of the FWA connection is below the operator defined threshold during a pre-defined time period, the FWA connection may be contributing to a number of active connections that are above an operator defined threshold for entering idle mode. The method begins with determining if the FWA connection is in a non-standalone mode and has LTE and NR configured. If the FWA connection meets the above criteria, then the aggregated data buffer requirements are compared with an operator defined aggregated data buffer threshold. If the aggregated data buffer requirements are less than the operator defined aggregated data buffer threshold, the NR leg is de-configured with NR cells in sleep mode. If NR cells are not in sleep mode, the NR leg may be re-configured.

If the aggregated data buffer requirements are greater than or equal to the operator defined aggregated buffer threshold, then the NR leg is moved from the capacity layer, such as first layer 406 in FIG. 4, which offers greater bandwidth, to the coverage layer, such as second layer 408 in FIG. 4, which uses a smaller bandwidth. The capacity layer, such as first layer 406 in FIG. 4 may be re-configured if the NR cells are not in sleep mode.

If the FWA connection is in standalone mode with only NR configured a determination is made as to whether the aggregated data buffer requirements of the FWA connection are below an operator defined aggregated data buffer threshold. If the above criterion is met, a determination is made as to whether NR carrier aggregation (NRCA) is enabled. If NRCA is enabled, the secondary cells are de-configured and the NR secondary cells enter sleep mode. The secondary cells may be reconfigured when the NR secondary cells are not in sleep mode.

A determination may also be made as to whether co-located LTE coverage is available. If co-located LTE coverage is available, a further determination is made as to whether the FWA connection supports non-standalone mode. If the FWA connection supports non-standalone mode, the FWA connection is moved to LTE for a non-standalone configuration with no NR leg.

If the FWA connection is in standalone mode with only NR radio configured and the aggregated data buffer requirements are greater than or equal to an operator defined aggregated data buffer threshold then a determination is made as to whether NRCA is configured with capacity layers, such as first layer 406 in FIG. 4. If NRCA is configured with capacity layers, then the secondary cells may be changed from the capacity layer to a coverage layer. The secondary cells that originally used the capacity layer may be reconfigured when the cells are not in sleep mode.

FIG. 5 is a flow diagram of an exemplary method for managing FWA access for energy efficient usage, in which aspects of the present disclosure may be employed, in accordance with aspects herein. The method 500 begins in step 502 with determining that a number of network users connected to a base station is less than an operator defined threshold during a predefined time of day and is greater than a sleep mode threshold, the number of network users comprising an FWA portion and a non-FWA portion. The method continues in step 504 with determining that the non-FWA portion of network users is less than the sleep mode threshold. Next, the method continues in step 506 with determining that the FWA portion of network users are configured to communicate with the base station in a non-standalone (NSA) mode, with each FWA user of the FWA portion communicating with the base station on a first link using a first wireless protocol and communicating with a second base station on a second link using a second wireless protocol. Then, in step 508 the method continues with performing an optimization based on a comparison between an aggregated data buffer requirement and a predetermined aggregated data buffer threshold.

The optimization action may further comprise de-configuring the first link and placing the base station in a sleep mode. The optimization action may be based on a determination that the aggregated data buffer is less than the predetermined aggregated data buffer threshold. The optimization action may further comprise reconfiguring the first link from a first frequency band to a second frequency band based on a determination that the aggregated data buffer requirement is greater than or equal to the predetermined aggregated data buffer threshold. The first frequency band may comprise higher frequencies than the second frequency band.

The method also provides for reconfiguring the NR leg of the base station once the predefined time of day has passed. The predefined time of day may be based on a home service location or a business service location. For the business service location the predefined time of day may be based on an hours of operation for the business service location. For the home service location the predefined time of day may be based on an hours of activity that is selected by at least one resident of the home service location. The predefined time of day may be set and changed later if the hours of activity for the home or business change. For example, a home service location may initially set the predefined time of day to be an overnight period, however, if a resident's work hours change, the predefined time may be changed. If the aggregated data buffer requirement is greater than or equal to the predetermined data buffer threshold, at least one NR leg of the base station may be moved from a capacity layer of the base station to a coverage layer of the base station. In addition, the at least one NR leg of the base station may be reconfigured if at least one NR cell is not in sleep mode.

FIG. 6 depicts an exemplary computing device suitable for use in implementations of the present disclosure, in accordance with aspects herein. With continued reference to FIG. 6, computing device 600 includes bus 610 that directly or indirectly couples the following devices: memory 612, one or more processors 614, one or more presentation components 616, input/output (I/O) ports 618, I/O components 620, radio(s) 624, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 present data indications to a person or other device. Exemplary one or more presentation components 616 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc.

The radio(s) 624 represents one or more radios that facilitate communication with a wireless telecommunications network. While a single radio 624 is shown in FIG. 6, it is contemplated that there may be more than one radio 624 coupled to the bus 610. It is expressly conceived that a computing device with more than one radio 624 could facilitate communication with the wireless telecommunications network using both radios. Illustrative wireless telecommunications technologies include CDMA, GPRS, TDMA, GSM, and the like. The radio 624 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for managing fixed wireless access (FWA) in a network, the method comprising:
   determining that a number of network users connected to a base station is less than an operator defined threshold during a predefined time of day and is greater than a sleep mode threshold, the number of network users comprising an FWA portion and a non-FWA portion;
   determining that the non-FWA portion of network users is less than the sleep mode threshold;
   determining that the FWA portion of network users are configured to communicate with the base station in a non-standalone (NSA) mode, wherein each FWA user of the FWA portion of network users communicates with the base station on a first link using a first wireless protocol and communicates with a second base station on a second link using a second wireless protocol; and
   performing an optimization action based on a comparison between an aggregated data buffer requirement and a predetermined aggregated data buffer threshold.

2. The method of claim 1, wherein the optimization action comprises de-configuring the first link and placing the base station in sleep mode based on a determination that the predetermined aggregated data buffer is less than the predetermined aggregated data buffer threshold.

3. The method of claim 1, wherein the optimization action comprises reconfiguring the first link from a first frequency band to a second frequency band based on a determination that the aggregated data buffer requirement is greater than or equal to the predetermined aggregated data buffer threshold, and wherein the first frequency band comprises higher frequencies than the second frequency band.

4. The method of claim 3, further comprising reconfiguring at least one new radio (NR) leg of the base station when at least one NR cell is not in the sleep mode.

5. The method of claim 1, wherein the predefined time of day is based on one of a home service location or a business service location.

6. The method of claim 5, wherein the predefined time of day for the business service location is based on an hours of operation for the business service location.

7. The method of claim 5, wherein the predefined time of day for the home service location is based on an hours of activity selected by an at least one resident of the home service location.

8. The method of claim 7, wherein the predefined time of day for the home service location is an overnight period.

9. A method for managing fixed wireless access (FWA) in a network, the method comprising:
   determining that a number of network users connected to a base station is less than an operator defined threshold during a predefined time of day and is greater than a sleep mode threshold, the number of network user comprising an FWA portion and a non-FWA portion;
   determining that the non-FWA portion of network users is less than the sleep mode threshold;
   determining that the FWA portion of network users are configured to communicate with the base station in a standalone (SA) mode wherein each FWA user of the FWA portion of network users communicates with the base station on a first link using a first wireless protocol; and
   performing an optimization action based on a comparison between an aggregated data buffer requirement and a predetermined aggregated data buffer threshold.

10. The method of claim 9, wherein the optimization action comprises de-configuring the first base station and placing it in sleep mode based on a determination that the first link and a second link to a second base station are used in a carrier aggregation session and that the aggregated data buffer requirements are less than the predetermined aggregated data buffer threshold.

11. The method of claim 9, wherein the optimization action comprises de-configuring the first base station and placing it in sleep mode and configuring a second link to a second base station using a second wireless protocol based on a determination that the FWA portion of network users can communicate with the second base station using the second protocol and that the aggregated data buffer requirements are less than the predetermined aggregated data buffer threshold.

12. The method of claim 9, wherein the optimization action comprises reconfiguring the first link from a first frequency band to a second frequency band based on a determination that the aggregated data buffer requirements are greater than or equal to the predetermined aggregated data buffer threshold.

13. The method of claim 12, further comprising, moving the FWA to the co-located LTE coverage at the base station with no new radio (NR) leg.

14. The method of claim 9, determining if NRCA is configured at the base station with at least one capacity layer when the aggregated data buffer requirement is greater than or equal to the predetermined aggregated data buffer threshold.

15. The method of claim 14, further comprising moving the at least one secondary cell from the at least one capacity layer of the base station to an at least one coverage layer of the base station when NRCA is configured at the base station with the at least one capacity layer.

16. A non-transitory computer storage media storing computer-useable instructions that, when used by one or more processors, cause the processors to:
   determine that a number of network users connected to a base station is less than an operator defined threshold during a predefined time of day and is greater than a sleep mode threshold;

determine that the number of network users is less than the sleep mode threshold;

determine a portion of network users configured to communicate with the base station in a non-standalone (NSA) mode, wherein the portion of network users communicating in the NSA mode communicate with the base station on a first link using a first wireless protocol and communicate with a second base station on a second link using a second wireless protocol; and perform an optimization action based on a comparison between an aggregated data buffer requirement and a predetermined aggregated data buffer threshold.

17. The non-transitory computer storage media of claim 16, wherein the predetermined time of day is nighttime.

18. The non-transitory computer storage media of claim 16, wherein the predefined time of day is outside normal business hours.

19. The non-transitory computer storage media of claim 18, wherein the predefined time of day is user-defined business hours.

20. The non-transitory computer storage media of claim 16, wherein the predefined time of day is based on one of a home service location or a business service location.

* * * * *